(12) United States Patent
Rottler

(10) Patent No.: US 8,167,437 B2
(45) Date of Patent: May 1, 2012

(54) MULTI-POSITIONAL SMOOTHING MIRROR FOR VIDEO PROJECTION OPTICS

(75) Inventor: Scott Allen Rottler, Avon, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 161 days.

(21) Appl. No.: 11/579,300

(22) PCT Filed: May 10, 2005

(86) PCT No.: PCT/US2005/016147
§ 371 (c)(1),
(2), (4) Date: Nov. 1, 2006

(87) PCT Pub. No.: WO2005/114996
PCT Pub. Date: Dec. 1, 2005

(65) Prior Publication Data
US 2007/0201007 A1    Aug. 30, 2007

Related U.S. Application Data

(60) Provisional application No. 60/570,595, filed on May 13, 2004.

(51) Int. Cl.
*G03B 21/28* (2006.01)
*H04N 5/74* (2006.01)
*G02B 7/182* (2006.01)
(52) U.S. Cl. ............. 353/77; 353/98; 348/782; 359/872
(58) Field of Classification Search .................. 353/77, 353/74, 78, 79, 98; 348/787, 789, 794, 836, 348/843, 782; 359/838, 871, 872
See application file for complete search history.

(56) References Cited

U.S. PATENT DOCUMENTS

| | | | | |
|---|---|---|---|---|
| 4,810,087 A * | 3/1989 | Tachibana et al. | ............... | 353/79 |
| 5,349,400 A * | 9/1994 | Kaplan et al. | ................. | 353/119 |
| 6,038,088 A * | 3/2000 | Ikegame | ....................... | 359/823 |
| 6,366,387 B1 | 4/2002 | Wilson | | |
| 6,388,789 B1 | 5/2002 | Bernstein | | |
| 6,792,170 B2 * | 9/2004 | Kiadeh | ........................... | 385/14 |
| 2002/0057863 A1 | 5/2002 | Nahum et al. | | |
| 2003/0020809 A1 | 1/2003 | Gibbon et al. | | |
| 2003/0035188 A1 * | 2/2003 | Tominaga et al. | ............. | 359/216 |

FOREIGN PATENT DOCUMENTS

| JP | 57-184337 | 4/1956 |
|---|---|---|
| JP | 57184337 | 4/1956 |
| JP | 60-102483 | 7/1985 |
| JP | 60102483 | 7/1985 |

(Continued)

OTHER PUBLICATIONS

Search Report dated Aug. 16, 2005.

*Primary Examiner* — Rochelle-Ann J Blackman
(74) *Attorney, Agent, or Firm* — Robert D. Shedd; Patricia A. Verlangieri

(57) ABSTRACT

A projection display is provided with a light engine including a damped piezo-electric smooth picture actuating device. The light engine comprises a mirror and an actuator for positioning the mirror. The actuator includes a tilting means that couples the actuator to the mirror. The tilting means has damping material attached thereto. The damping material may be a polymeric material.

12 Claims, 5 Drawing Sheets

FOREIGN PATENT DOCUMENTS

| | | |
|---|---|---|
| JP | 61-157939 | 9/1986 |
| JP | 61157939 | 9/1986 |
| JP | 63-65872 | 5/1988 |
| JP | 6365872 | 5/1988 |
| JP | 63-183979 | 7/1988 |
| JP | 04-228883 | 8/1992 |
| JP | 05-281501 | 10/1993 |
| JP | 11-303918 | 11/1999 |
| JP | 2001-051350 | 2/2001 |
| JP | 2002-70944 | 3/2002 |
| JP | 2004-6153 | 2/2004 |
| KR | 19990017010 | 5/1999 |
| WO | WO00/74541 | 12/2000 |

\* cited by examiner

MULTI-POSITIONAL SMOOTHING MIRROR FOR VIDEO PROJECTION OPTICS

This application claims the benefit, under 35 U.S.C. §365 of International Application PCT/US05/16147 filed May 10, 2005, which was published in accordance with PCT Article 21(2) on Dec. 1, 2005 in English and which claims the benefit of U.S. provisional patent application No. 60/570,595 filed May 13, 2004.

CROSS-REFERENCE TO RELATED APPLICATIONS

This application claims the benefit of U.S. Provisional Patent Application Ser. No. 60/570,595, entitled "Multi-Positional Smoothing Mirror for Video Projection Optics" and filed May 13, 2004, which is incorporated by reference herein in its entirety.

FIELD OF THE INVENTION

The invention relates generally to a projection display and, in particular a smoothing mirror for a projection display.

BACKGROUND OF THE INVENTION

Some new projection televisions include a light engine. Such light engines use a piezo-electric actuator and a rocking mechanism to hit a smoothing mirror between two locations. One example of the smooth picture actuator is a spring-mass type system. The piezo-electric actuator is designed to multiplex a video image that is decomposed into two sub-images. When sub-image A is projected on the screen, a small mirror ~25 mm×25 mm is held in position "A". Microseconds later, when sub-image B is projected, the piezo-electric motor is actuated and moves the rocker arm that the mirror is attached to into position "B". When the next sub-image "A" is projected, current is removed form the piezo device and a return spring, for example, moves the mirror and rocker arm back into position "A".

In the presence of audible noise from speakers or shock waves that can be transmitted by someone walking across a floor, there can be transmission of these forces into the light engine and into the piezo-electric actuator device. It is not uncommon for the amplitude of these forces to be amplified as they are transmitted through the system of the television cabinet plastics and light engine. When these forces are transmitted to the piezo-electric actuator device they may be large enough to undesirably induce motion in the rocker arm that overcomes the spring force and allows the mirror to oscillate outside of its intended frequency

SUMMARY OF THE INVENTION

According to an exemplary embodiment of the invention, a projection display is provided with a light engine including a damped piezo-electric smooth picture actuating device. The light engine comprises a mirror and an actuator for positioning the mirror. The actuator includes a tilting means that couples the actuator to the mirror. The tilting means has damping material attached thereto. The damping material may be a polymeric material.

BRIEF DESCRIPTION OF THE DRAWING FIGURES

The preferred embodiments of the present invention will be described with reference to the accompanying drawing figures, of which:

DETAILED DESCRIPTION

Figure 1A:
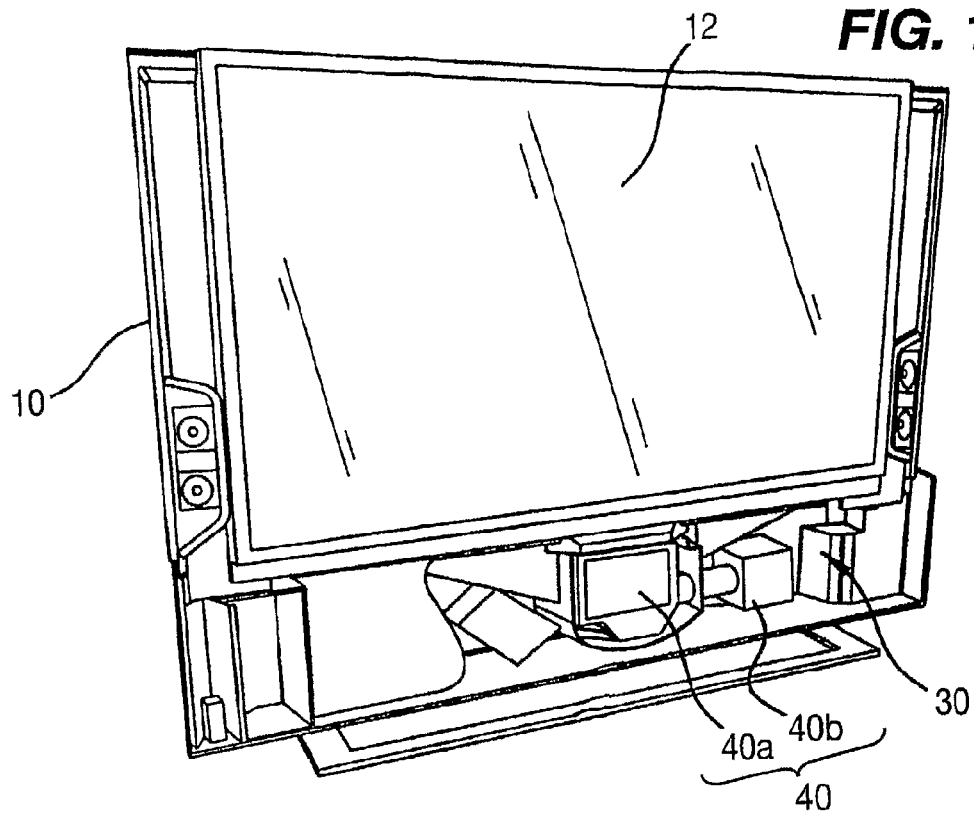
FIGS. 1A and 1B are perspective front views of a projection display according to an exemplary embodiment of the present invention, with FIG. 1A shown with a front panel removed to show a light engine of the projection display and FIG. 1B shown with a screen removed to show a light box.
Figure 1B:
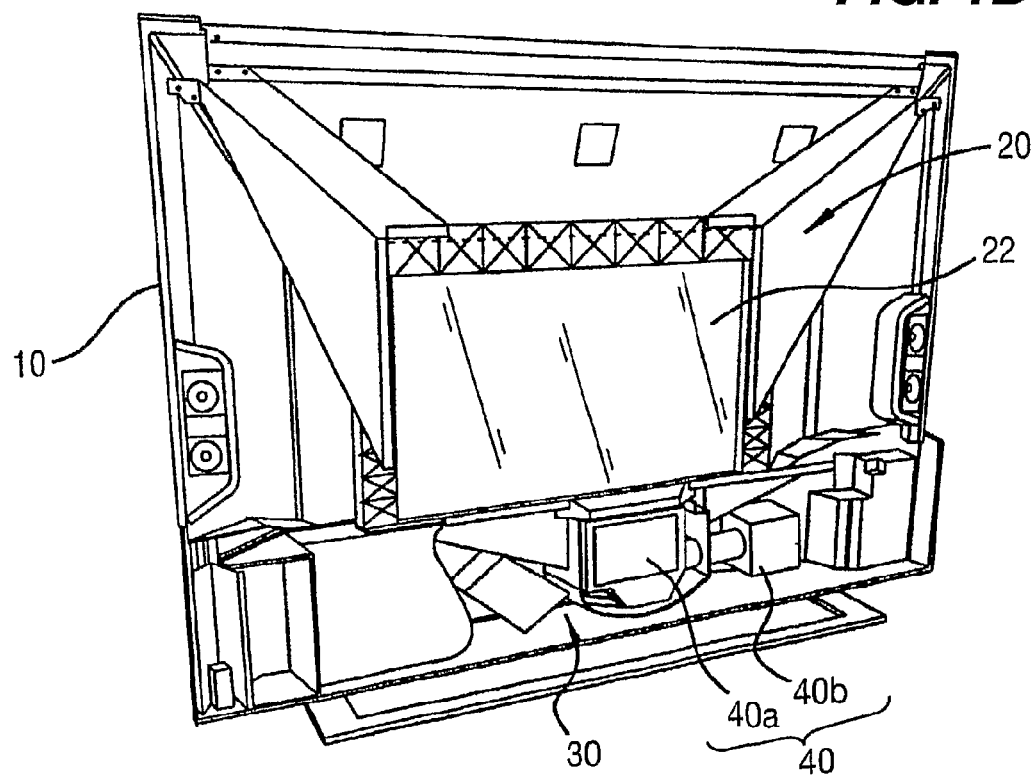
Figure 2:
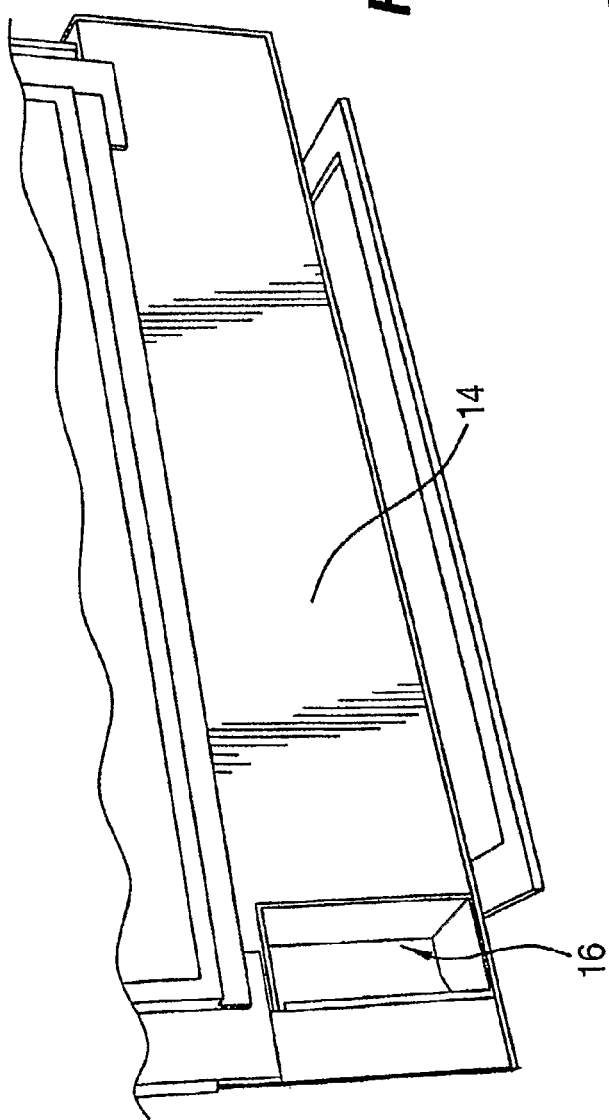
FIG. 2 is a detail perspective front view of the projection display of FIGS. 1A and 1B, shown with the front panel in place.
Figure 3:
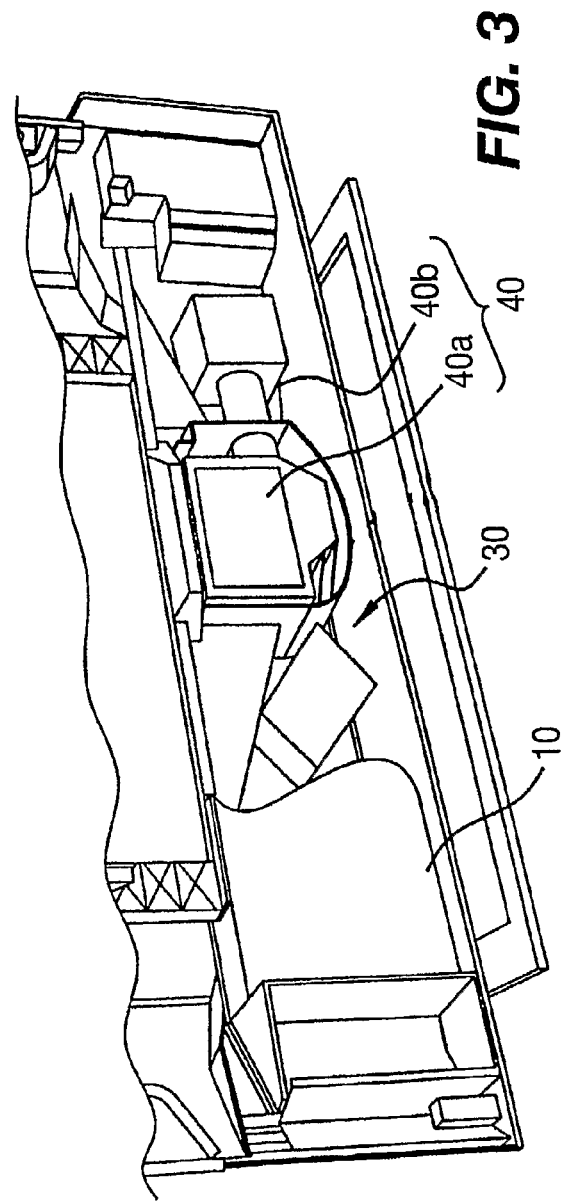
FIG. 3 is a detailed perspective front view of the projection display of FIGS. 1A, 1B, and 2, shown with the front panel removed.
Figure 4:
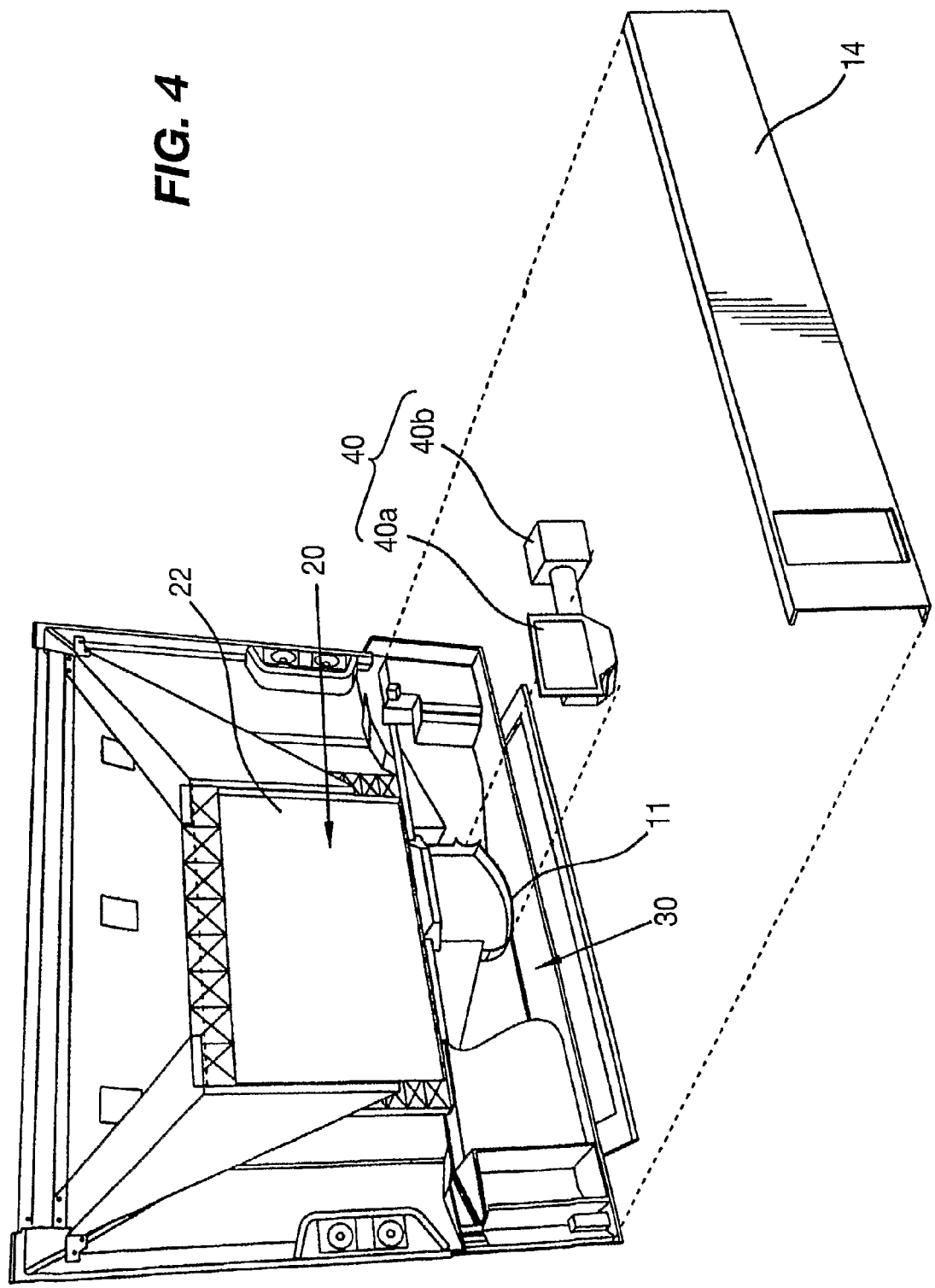
FIG. 4 is an exploded front view of the projection display of FIGS. 1A, 1B, 2, and 3.
Figure 5:
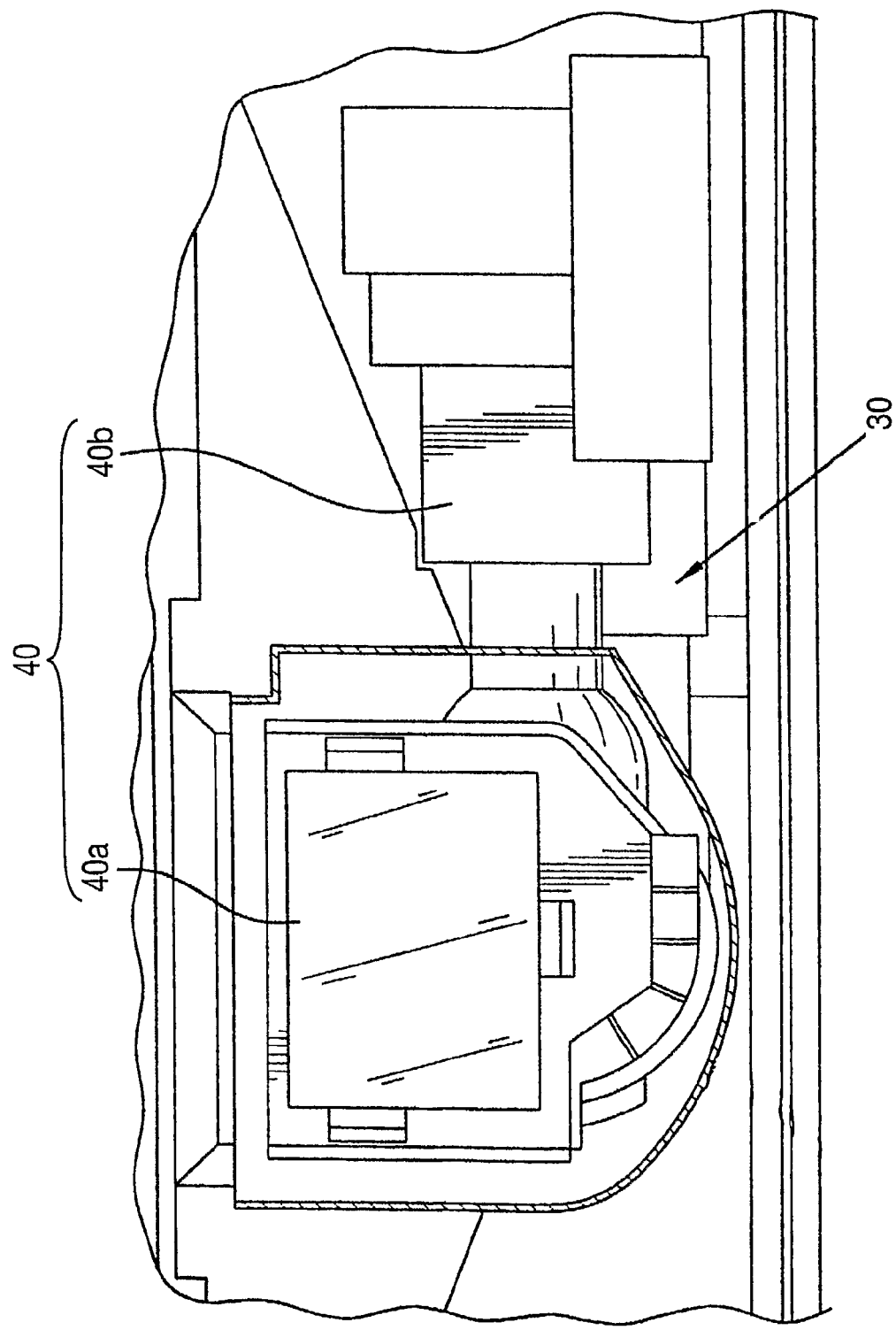
FIG. 5 is a detailed front view of a light engine of a projection display according to an exemplary embodiment of the present invention.

According to an exemplary embodiment of the invention, a projection display, is provided with a light engine including a damped piezo-electric smooth picture actuating device. As shown in FIGS. 1A-5, the projection display comprises a cabinet 10 that is formed from a molded plastic and comprises an electronic area 30, a mirror 22 and a light box 20. A light engine 40 comprises an output end 40a from which a light pattern is projected and an electronic end 40b having a lamp and various electronic components therein. The light engine 40 is mounted with the output end 40a in the light box 20 of the cabinet 10 and with the electronic end 40b in the electronic area 30. As shown in FIG. 1A a screen 12 is mounted over the light box 20

A removable front cover 14 (shown in FIG. 2) covers the light engine 40 and the electronic area 30, when it is installed on the cabinet 10.

Figure 6:
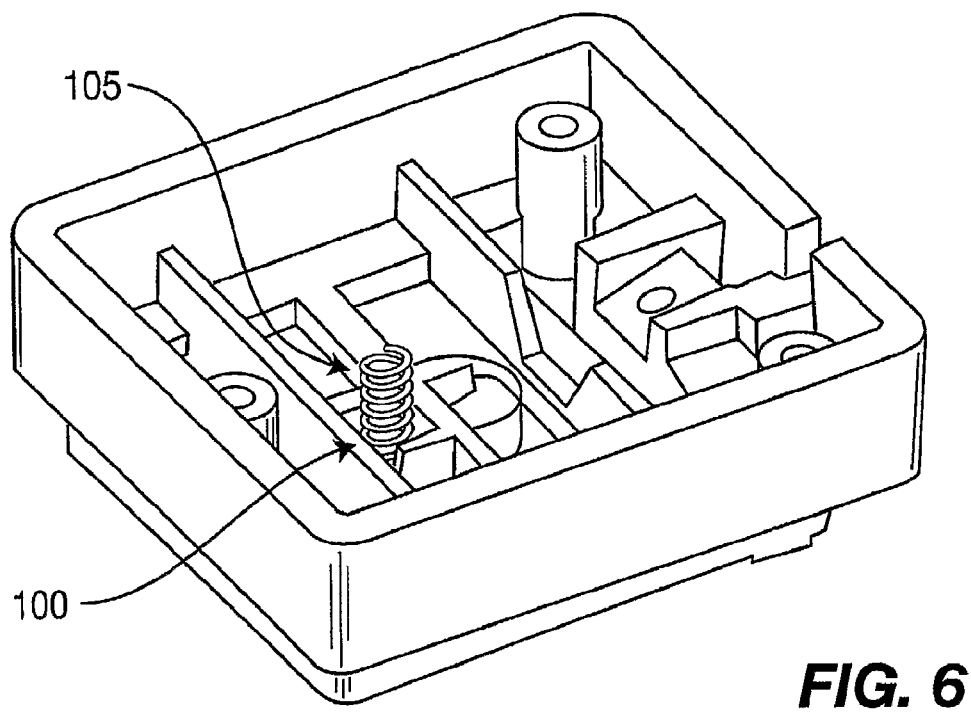
FIG. 6 is a detailed view of a damped actuator device of the present invention used in the light engine of FIGS. 1A, 1B, 2, 3, 4, and 5.

According to an exemplary embodiment of the invention, a light engine comprises a mirror and an actuator. The actuator includes a frame 100 (FIG. 6) within which is located a tilting means 105 for positioning the mirror (not shown). The actuator includes a tilting means that couples the actuator to the mirror. The tilting means 105 has damping material 110 (FIGS. 7A-7C) attached thereto. The damping material may be a polymeric material.

Figure 7A:
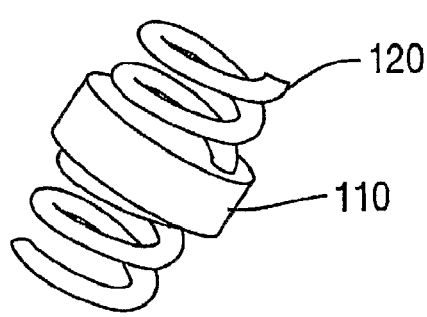
FIGS. 7A-7C each depicts a front view of damped tilting means of the present invention.

In one embodiment shown in FIG. 7A, a round piece of shock damping material 110 is inserted into a circular opening in a coil or compression type spring. 120 (tilting means) of the piezo-electric actuator. The shock damping material 110 may for example, be slightly larger in outer diameter than the inner diameter of the spring 120 to ensure positive contact is made around the perimeter of the shock damping material 110. The addition of the shock damping material 110 to the spring 120 eliminates the natural vibratory resonance that is inherent to coil, or compression springs.

Figure 7B:
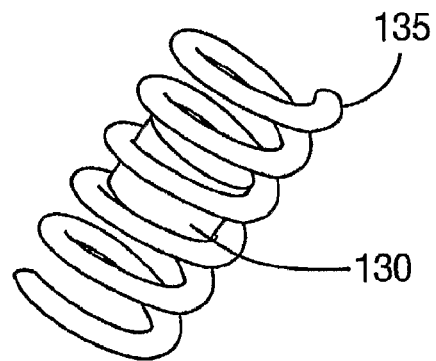

In another embodiment shown in FIG. 7B, the shock damping material 130 is overmolded to the center portion of the compression spring 135. In this embodiment, a spring may be placed in an injection mold and allow damping material to be molded into the center of the spring as well as encompassing the outside of the coils as well. This process may be applied over a portion of the middle of the spring in an area for example, approximating 3 mm.

Figure 7C:
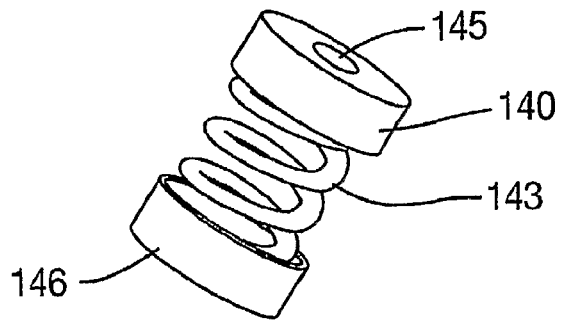

Another embodiment shown in FIG. 7C, may include the shock damping material 140 attached on the two ends 145, 146 of the spring 143. This arrangement allows the center of the spring to be free floating and would dampen the coil spring directly at its interface with the mating parts of the actuator.

Tests were performed on springs with and without shock damping material as shown in FIGS. 7A-7C. Prior to shock material installation, the small mirror exhibited unwanted vibratory oscillation at 100 Hz, 140 Hz, 200 Hz and 420 Hz when an audible sine sweep was applied to front speakers of the projection television. After the shock damping material was added to the tilting means, for example, the spring, the presence of the unwanted oscillation disappeared.

The foregoing illustrates some of the possibilities for practicing the invention. Many other embodiments are possible within the scope and spirit of the invention. It is intended, therefore, that the foregoing description be regarded as illustrative rather than limiting, and that the scope of the invention be given by the appended claims together with their full range of equivalents.

The invention claimed is:

1. A light engine for a projection system, comprising:
a mirror; and
an actuator for positioning the mirror, wherein a tilting means having damping material attached thereto couples the actuator to the mirror, and wherein the damping material has a larger diameter than that of the tilting means.

2. The light engine of claim 1 wherein the tilting means is one of a coil and a spring.

3. The light engine of claim 1 wherein the damping material is a polymeric material.

4. The light engine of claim 1 wherein the damping material is attached to the center of the tilting means.

5. The light engine of claim 1 wherein the damping material is attached to at least two portions of the tilting means.

6. The light engine of claim 5 wherein the damping material is attached to two ends of the tilting means.

7. A projection system, comprising:
a light engine with a mirror; and
an actuator for positioning the mirror, wherein a tilting means having damping material attached thereto couples the actuator to the mirror and wherein the damming material has a larger diameter than that of the tilting means.

8. The projection system of claim 7 wherein the tilting means is one of a coil and a spring.

9. The projection system of claim 7 wherein the damping material is a polymeric material.

10. The projection system of claim 7 wherein the damping material is attached to the center of the tilting means.

11. The projection system of claim 7 wherein the damping material is attached to at least two portions of the tilting means.

12. The projection system of claim 11 wherein the damping material is attached to two ends of the tilting means.

* * * * *